UNITED STATES PATENT OFFICE.

JOHN BUCKLAND JENKINS, OF PITTSBURG, PENNSYLVANIA, ASSIGNOR TO THE HUTCHINSON-JENKINS STEEL COMPANY, OF WEST VIRGINIA.

PROCESS AND COMPOSITION OF MATTER FOR THE MANUFACTURE OF STEEL.

SPECIFICATION forming part of Letters Patent No. 490,660, dated January 31, 1893.

Application filed March 17, 1892. Serial No. 425,239. (No specimens.)

*To all whom it may concern:*

Be it known that I, JOHN BUCKLAND JENKINS, a subject of the Queen of Great Britain, and a resident of Pittsburg, Allegheny county, and State of Pennsylvania, have invented certain new and useful Improvements in the Manufacture of Steel, of which the following is a specification.

My invention relates to a cementing, converting or annealing process of manufacturing steel of any grade or quality from Bessemer open hearth steel or malleable or cast iron bars or billets and consists in an improved compound and method of treatment employed whereby the deleterious matters contained in the material to be treated are neutralized or counteracted, and my composition is combined with the metal under heat in such a manner as will render the product compact, homogeneous and of a fine grade, running high in carbon and possessing the quality desired and being of any particular hardness such as may be requisite for the uses for which the same is to be employed.

My invention is different from those where melting processes are used in the manufacture of steel and is superior to those in the economy of its use and in the character and quality of the products obtained.

According to my improved process the metal to be treated is subjected to a moderate high and uniform heat which however, is not sufficient to melt the same,—and is treated with my chemical compound for such length of time as the particular product to be obtained requires.

My compound consists of the following reagents namely:—A carbonaceous substance as charcoal where by hardness is imparted to the product; binoxide of manganese which produces malleability and ductility; chloride of sodium, which softens and gives tenacity; cyanide of potassium which hardens and makes the steel take temper more readily; and chloride of ammonium which serves for the same purpose as the cyanide of potassium but is cheaper, and is therefore used in larger proportions, nitrogen being the element essential. The above reagents are pulverized and mixed together, the proportions being varied according to the qualities which is desired to be secured in the product, and the metal is treated with the same at a uniform heat not high enough to melt the product for a greater or less period of time, according to the size of the castings or bars to be so treated.

Preparatory to conversion, the castings or bars are dipped in a solution of vitriol and water, then to correct the acidity with lime and water. I thus get rid of any oxidation there may be, so that the surface will be clean.

A layer of my compound consisting of the various reagents mixed together in a pulverized condition is laid upon the bottom of the furnace, and the castings, bars or any material that is to be treated is laid upon this, another layer of my compound is laid upon the top of the same, then is added another layer of material to be treated and so on, until the pile is ordinarily of a height equal to that of the furnace charging chamber, the door of which is bricked up, and the requisite degree of uniform heat is applied for such length of time as the product to be obtained requires.

While no special type of furnace is absolutely required for the production of steel by my process, provided only that economy in fuel and rapidity in producing heat can be secured, yet I much prefer to use one having a series of converting chambers heated from a common flue and provided with an initial blast and a supplementary super-heated hot air blast as described in my application for patent, dated March 12, 1892, Serial No. 424,720.

The time required in my converting or annealing process will depend as stated upon the size of the material to be treated, whether the same is in small pieces or in a large mass or masses, and the proportion of elements of my formula may be varied according as to the particular hardness, softness &c., which is required in the product under treatment.

The steel produced by the employment of my converting process with the use of my compound is compact and free from cracks and seams. It is homogeneous and uniform in structure, and of a quality that renders it suitable for machinery of different kinds, high grade tool steel, &c.

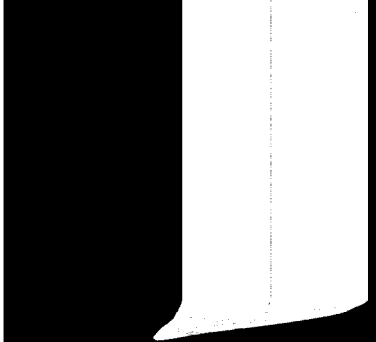

Having thus described my invention, what I claim as new and desire to secure by Letters Patent is:—